(No Model.)
A. WEBER.
DENTAL ENGINE.
No. 354,819. Patented Dec. 21, 1886.
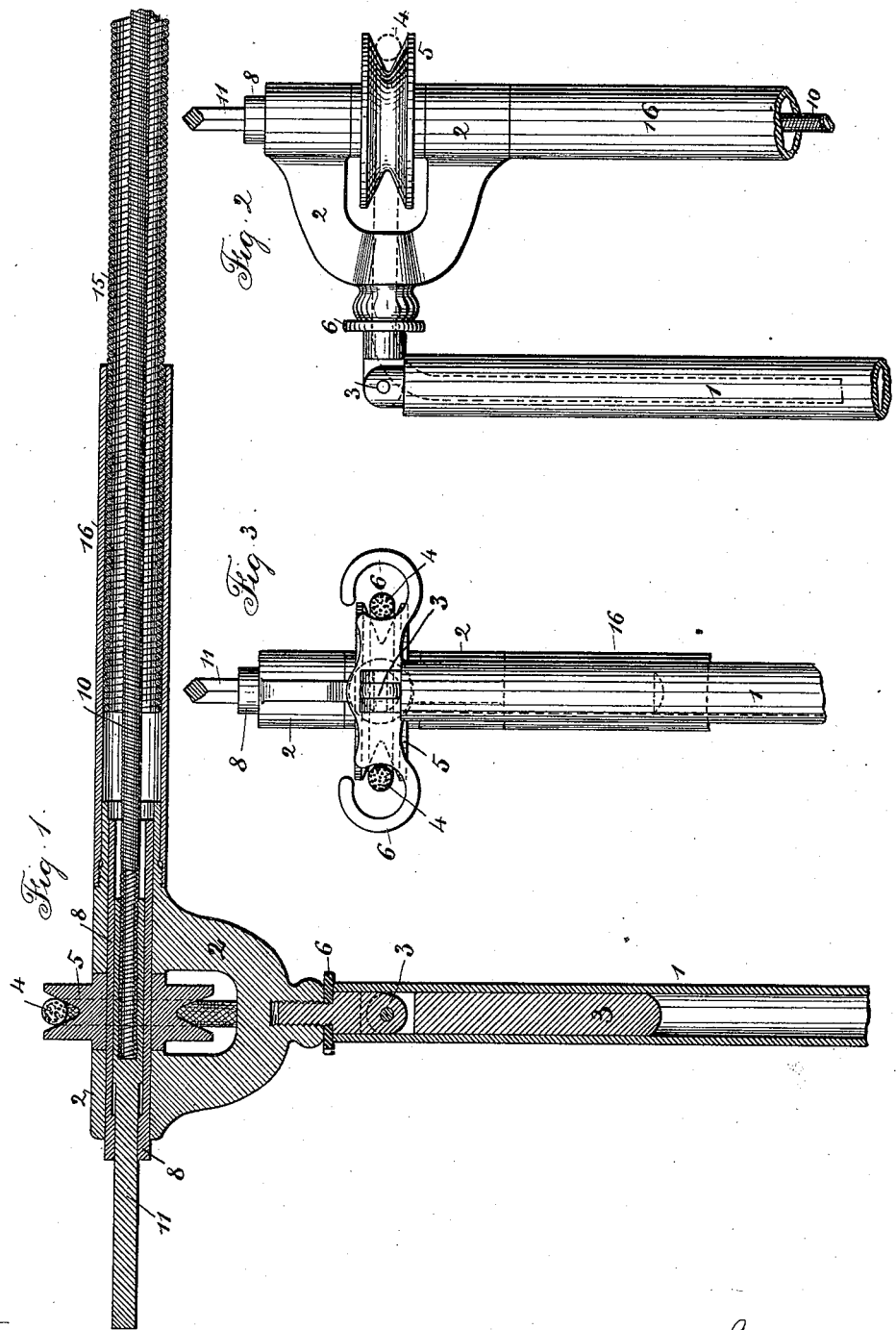
Witnesses:
J. Staib
Chas. H. Smith
Inventor:
August Weber
per Lemuel W. Serrell
atty

UNITED STATES PATENT OFFICE.

AUGUST WEBER, OF NEW YORK, N. Y.

DENTAL ENGINE.

SPECIFICATION forming part of Letters Patent No. 354,819, dated December 21, 1886.

Application filed April 19, 1886. Serial No. 199,320. (No model.)

*To all whom it may concern:*

Be it known that I, AUGUST WEBER, of the city and State of New York, have invented an Improvement in Dental Engines, of which the following is a specification.

In dental engines it is usual to employ a revolving flexible shaft within a tubular case, at the end of which is the hand-piece. In consequence of the curvature given to the flexible shaft while actuating the hand-piece, the flexible shaft within the case is subject to more or less endwise tension, which is disadvantageous, because it tends to bind the said flexible shaft more or less against the interior surface of the tubular case.

My improvement is made for insuring greater freedom in the rotation of the flexible shaft within the case and for simplifying the construction, and at the same time I provide for retaining the belt upon the pulley of the flexible shaft, when said flexible shaft and its case are allowed to hang in a vertical position when not in use.

In the drawings, Figure 1 is a vertical section of the upper part of the standard and of the pulley and a portion of the flexible shaft. Fig. 2 is an elevation of the parts in the position they assume when the flexible shaft is hanging vertically, and Fig. 3 is a similar elevation at right angles to Fig. 2.

The tubular standard 1 is supported in any ordinary manner, and at the upper end thereof is the pulley-head 2, from the lower end of which the jointed pivot-rod 3 projects downwardly into the upper end of the tubular standard 1. This pivot-rod 3 allows the pulley-head 2 and the flexible shaft and case that are connected to the same to swivel at the top of the tubular standard and swing around horizontally.

The knuckle or rule joint in the pivot-rod 3 in its ordinary position is within the upper end of the tubular standard 1; but when the pulley-head and pivot-rod are raised and the joint elevated above the tubular standard the parts can swing on the joint of the pivot-rod and the flexible shaft hang vertically, so as not to become bent or set in any direction when not in use. This jointed pivot-rod, however, is not my invention, the same having been used by Dr. Delois Palmer in New York for many years. When the flexible shaft is allowed to hang vertically, the belt 4 is liable to slip off the pulley 5. I have therefore improved upon these pre-existing devices by attaching at the lower end of the pulley-head the belt-guide 6, which is in the form of a cross-head having holes through which the belt passes freely; but when the pulley-head is turned upon the jointed pivot-rod and the shaft hangs in a vertical position the belt 4 is retained upon the pulley 5 by the belt-guide 6.

The pulley 5 is upon a tubular spindle, 8, that passes through the pulley-head 2 and revolves freely in the bearings upon such pulley-head, and by making the pulley fit tightly upon the tubular spindle the parts are easily connected by driving the tubular spindle into the pulley after the latter has been placed between the bearings of the pulley-head.

The flexible shaft 10 is of ordinary character; but upon the end thereof a prismatic rod, 11, is securely fastened, and the tubular spindle 8 is sufficiently large to allow the prismatic rod to slide freely therein, and at one end of the said tubular spindle 8 the hole is made square or prismatic to receive the rod 11. By this construction the prismatic rod at the end of the flexible shaft can slide backward and forward freely within the tubular spindle, and the prismatic rod and flexible shaft will be rotated by the tubular spindle and pulley, thus preventing the flexible shaft becoming bound or rubbing forcibly against the interior of the flexible case.

The flexible cover or case 15 is of ordinary construction. It is fastened into the tubular shield 16, and this in turn is screwed upon a cylindrical projection at one end of the pulley-head 2. This shield 16 has sufficient leverage to turn the pulley-head upon the jointed pivot-rod without any risk of injuring the flexible case at its junction with the tubuler shield, thus rendering the end of the flexible case more durable than heretofore.

I claim as my invention—

1. The combination, with the pulley and its head, of a tubular standard, a cylindrical pivot-rod fitting into the tubular standard and on which the pulley-head can swivel, a joint in such pivot-rod that allows the pulley-head to be swung down when the pivot-rod is raised to bring the joint above the tubular standard, and a guide at the base of the head to keep the belt upon the pulley, substantially as set forth.

2. The combination, with the pulley-head and pulley, of a tubular spindle passing through the pulley and through the bearings of the pulley-head, the opening in said tubular spindle being prismatic, the flexible case, the flexible shaft within the case, and a prismatic rod attached to the end of the flexible shaft and passing freely through the tubular spindle, substantially as set forth.

3. The combination, with the pulley and head, tubular standard, and jointed pivot-rod, of the tubular shield, attached at one end to the pulley-head, the flexible case connected at the other end of the tubular shield, flexible shaft passing through the shield and case, and the prismatic rod attached to the flexible shaft and passing into the axis of the pulley, substantially as specified.

Signed by me this 16th day of April, A. D. 1886.

AUGUST WEBER.

Witnesses:
GEO. T. PINCKNEY,
WILLIAM G. MOTT.